United States Patent
Sasano et al.

(10) Patent No.: US 10,040,395 B2
(45) Date of Patent: Aug. 7, 2018

(54) VEHICULAR DISPLAY CONTROL APPARATUS

(71) Applicant: DENSO CORPORATION, Kariya, Aichi-pref. (JP)

(72) Inventors: Takanori Sasano, Kariya (JP); Takahira Katoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 37 days.

(21) Appl. No.: 15/323,753

(22) PCT Filed: Jul. 7, 2015

(86) PCT No.: PCT/JP2015/003418
§ 371 (c)(1),
(2) Date: Jan. 4, 2017

(87) PCT Pub. No.: WO2016/013167
PCT Pub. Date: Jan. 28, 2016

(65) Prior Publication Data
US 2017/0158132 A1    Jun. 8, 2017

(30) Foreign Application Priority Data
Jul. 22, 2014    (JP) .................. 2014-149053

(51) Int. Cl.
| | |
|---|---|
| *B60R 1/00* | (2006.01) |
| *B60Q 9/00* | (2006.01) |
| *G08G 1/16* | (2006.01) |
| *H04N 7/18* | (2006.01) |
| *G06T 7/70* | (2017.01) |

(Continued)

(52) U.S. Cl.
CPC ............... *B60R 1/00* (2013.01); *B60Q 9/008* (2013.01); *G02B 27/01* (2013.01);
(Continued)

(58) Field of Classification Search
CPC .. G08G 1/166; G02B 27/01; G02B 2027/138; G02B 2027/014; G06T 7/0051;
(Continued)

(56) References Cited

U.S. PATENT DOCUMENTS

| | | | | |
|---|---|---|---|---|
| 3,521,234 A | * | 7/1970 | Davin ....................... | B60R 1/02 340/435 |
| 3,603,929 A | * | 9/1971 | Drysdale ................... | B60R 1/00 340/435 |

(Continued)

FOREIGN PATENT DOCUMENTS

| | | |
|---|---|---|
| JP | 2007261534 A | 10/2007 |
| WO | WO-2003005102 A1 | 1/2003 |

*Primary Examiner* — Christopher E Leiby
(74) *Attorney, Agent, or Firm* — Harness, Dickey & Pierce, P.L.C.

(57) ABSTRACT

A vehicular display control apparatus controls an image reflecting off one of a windshield and a combiner to allow an occupant of a vehicle to visually recognize a virtual image of the image. The apparatus generates a line image and an obstacle image concerning an obstacle around the vehicle and acquires a relative direction of the obstacle with reference to the vehicle. When the obstacle exists ahead of the vehicle, a line virtual image is shaped in concave in a first direction. When the obstacle exists behind the vehicle, the line virtual image is shaped in concave in a second direction opposite to the first direction. A position of an obstacle virtual image depends on a relative direction of the obstacle with reference to the vehicle along a width direction of the vehicle.

7 Claims, 11 Drawing Sheets

(51) Int. Cl.
*G06K 9/00* (2006.01)
*G02B 27/01* (2006.01)

(52) U.S. Cl.
CPC ............ *G06K 9/00805* (2013.01); *G06T 7/70* (2017.01); *G08G 1/166* (2013.01); *G08G 1/167* (2013.01); *H04N 7/181* (2013.01); *B60R 2300/105* (2013.01); *B60R 2300/205* (2013.01); *B60R 2300/301* (2013.01); *B60R 2300/308* (2013.01); *B60R 2300/804* (2013.01); *B60R 2300/8033* (2013.01); *B60R 2300/8066* (2013.01); *B60R 2300/8093* (2013.01); *G02B 2027/0141* (2013.01)

(58) Field of Classification Search
CPC .......... G06T 7/004; G06T 2207/10016; G06T 2207/30261; G06T 2207/10028; G06K 9/00805; B60R 11/04; B60R 1/00; B60R 2300/8093; B60R 2300/307; B60R 2300/205; B60K 35/00; B60K 2350/106
See application file for complete search history.

(56) References Cited

U.S. PATENT DOCUMENTS

| | | | |
|---|---|---|---|
| 8,874,317 B2* | 10/2014 | Marczok | B60Q 9/005 701/41 |
| 2002/0167589 A1* | 11/2002 | Schofield | B60N 2/002 348/148 |
| 2004/0178894 A1 | 9/2004 | Janssen | |
| 2005/0154505 A1* | 7/2005 | Nakamura | G01C 21/365 701/1 |
| 2007/0279317 A1* | 12/2007 | Matsumoto | B60K 35/00 345/7 |
| 2008/0186156 A1* | 8/2008 | Uematsu | B60K 35/00 340/441 |
| 2009/0225434 A1* | 9/2009 | Nicholas | B60R 1/00 359/630 |
| 2010/0020170 A1* | 1/2010 | Higgins-Luthman | B60Q 1/1423 348/135 |
| 2011/0251768 A1* | 10/2011 | Luo | B60W 30/12 701/70 |
| 2011/0301813 A1* | 12/2011 | Sun | B62D 15/029 701/41 |
| 2012/0194681 A1* | 8/2012 | Atsmon | G01C 21/3602 348/149 |
| 2013/0249684 A1* | 9/2013 | Hatakeyama | B60K 35/00 340/435 |
| 2013/0321628 A1* | 12/2013 | Eng | B60R 1/00 348/148 |
| 2014/0002252 A1* | 1/2014 | Fong | B60Q 9/008 340/435 |

* cited by examiner

FIG. 11

VEHICULAR DISPLAY CONTROL APPARATUS

CROSS REFERENCE TO RELATED APPLICATIONS

This application is a U.S. National Phase Application under 35 U.S.C. 371 of International Application No. PCT/JP2015/003418 filed on Jul. 7, 2015 and published in Japanese as WO 2016/013167 A1 on Jan. 28, 2016. This resent application is based on and claims the benefit of priority from Japanese Patent Application No. 2014-149053 filed on Jul. 22, 2014. The entire disclosures of all of the above applications are incorporated herein by reference.

TECHNICAL FIELD

The present disclosure relates to a vehicular display control apparatus.

BACKGROUND ART

Conventionally, there is provided a head-up display apparatus for displaying images related to a subject vehicle and an obstacle such as a pedestrian or a different vehicle detected around the subject vehicle. For example, the head-up display apparatus described in patent literature 1 displays relative positional relation between a subject vehicle image and an obstacle image and thereby allows an occupant to recognize where an obstacle actually exists around the subject vehicle. The head-up display apparatus displays the subject vehicle image representing the whole of the subject vehicle and thereby allows the occupant to recognize a front, back, right, or left direction of the subject vehicle image. The head-up display apparatus also displays the relative positional relation between the subject vehicle image and the obstacle image. The occupant can thereby recognize an actual obstacle position relative to the subject vehicle.

PRIOR ART LITERATURES

Patent Literature

Patent Literature 1: JP 2007-261534 A

SUMMARY OF INVENTION

However, the above-mentioned head-up display apparatus displays a subject vehicle image representing the entire subject vehicle in order to express the relative positional relation between the subject vehicle and an obstacle around the actual subject vehicle. Therefore, when the head-up display apparatus, which uses a limited display region to display images, uses much of the display region area for displaying an image of the entire subject vehicle, it becomes difficult for the head-up display apparatus to display an image concerning other information within the display region, causing inconvenience.

It is an object of the present disclosure to provide a vehicular display control apparatus capable of allowing an occupant to recognize an obstacle position relative to an actual subject vehicle while decreasing an available area of a display region to display an image.

A vehicular display control apparatus in an example of the present disclosure controls an image reflecting off one of a windshield and a combiner to allow an occupant of a subject vehicle to visually recognize a virtual image of the image, the apparatus comprising: an image generation section that generates a line image and an obstacle image concerning an obstacle around the subject vehicle; and an obstacle direction acquisition section that acquires a relative direction of the obstacle with reference to the subject vehicle, wherein: when the obstacle direction acquisition section acquires presence of the obstacle ahead of the subject vehicle, a line virtual image serving as the virtual image of the line image is shaped in concave in a first direction, the first direction being one of upward and downward; when the obstacle direction acquisition section acquires presence of the obstacle behind the subject vehicle, the line virtual image is shaped in concave in a second direction, the second direction being opposite to the first direction; and a position of an obstacle virtual image serving as the virtual image of the obstacle image depends on a relative direction of the obstacle with reference to the subject vehicle along a width direction of the subject vehicle acquired by the obstacle direction acquisition section.

The vehicular display control apparatus enables an occupant to recognize the direction of the concave shape of a virtual image corresponding to a line image and thereby recognize whether the obstacle exists ahead of or behind the actual subject vehicle. The occupant can recognize in which direction along the width direction of the actual subject vehicle the obstacle exists, based on the display position of the virtual image corresponding to the obstacle image. Moreover, an available area of the display region to display a line image is smaller than an available area of the display region to display an image of the entire subject vehicle. The occupant can therefore recognize the direction of an obstacle around the subject vehicle while reducing the available area of the display region.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following describes the vehicular display control apparatus according to the embodiment with reference to the accompanying drawings. A plurality of embodiments is described below with reference to the accompanying drawings. In embodiments, the same reference numerals are given to elements corresponding to those described in a preceding embodiment and a duplicate description may be omitted for simplicity. When an embodiment describes only part of the configuration, the other parts of the configuration can reference and conform to the description of the other preceding embodiments.

First Embodiment

Figure 1:
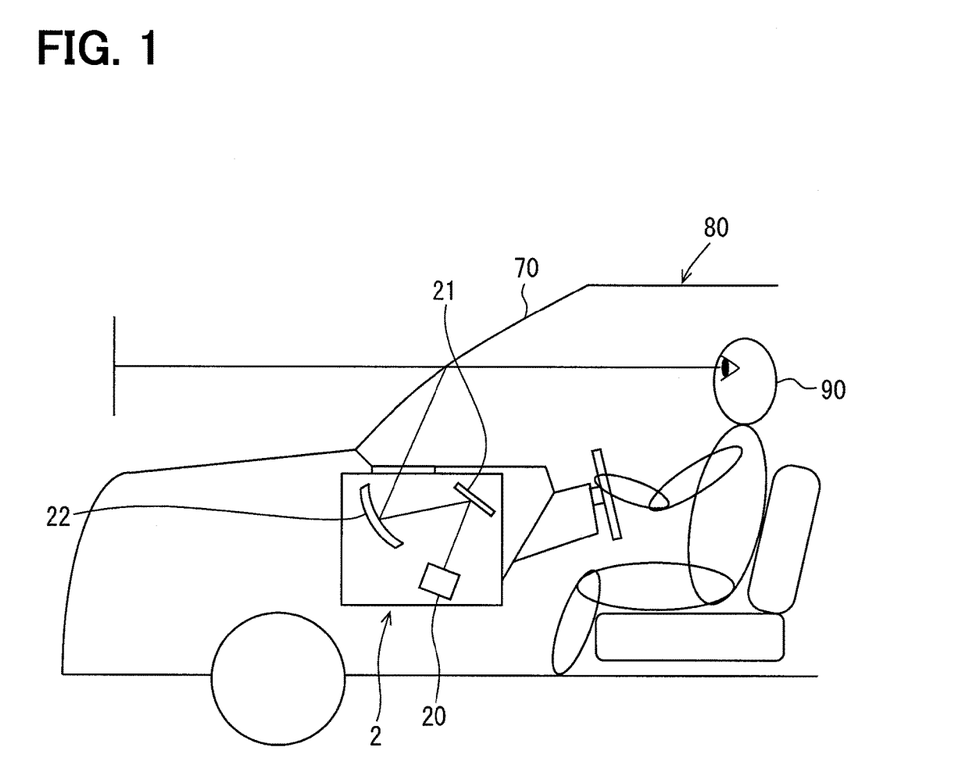
FIG. 1 is a diagram illustrating how a head-up display apparatus is placed according to a first embodiment.

As illustrated in FIG. 1, a head-up display apparatus 2 (hereinafter referred to as an HUD 2) is provided for a subject vehicle 80. The HUD 2 is contained in an instrument panel.

The HUD 2 includes a projector 20, a reflecting mirror 21, and a concave mirror 22. The projector 20 irradiates an image as light to the reflecting mirror 21. The reflecting mirror 21 reflects the light irradiated from the projector 20 to the concave mirror 22. The concave mirror 22 reflects the light reflected from the reflecting mirror 21 to the windshield 70. The windshield 70 reflects the light reflected from the concave mirror 22 to an occupant 90. The occupant 90 visually recognizes the light reflected from the windshield 70 as a virtual image. The HUD 2 can allow the occupant 90 to recognize the image as a virtual image.

Figure 2:
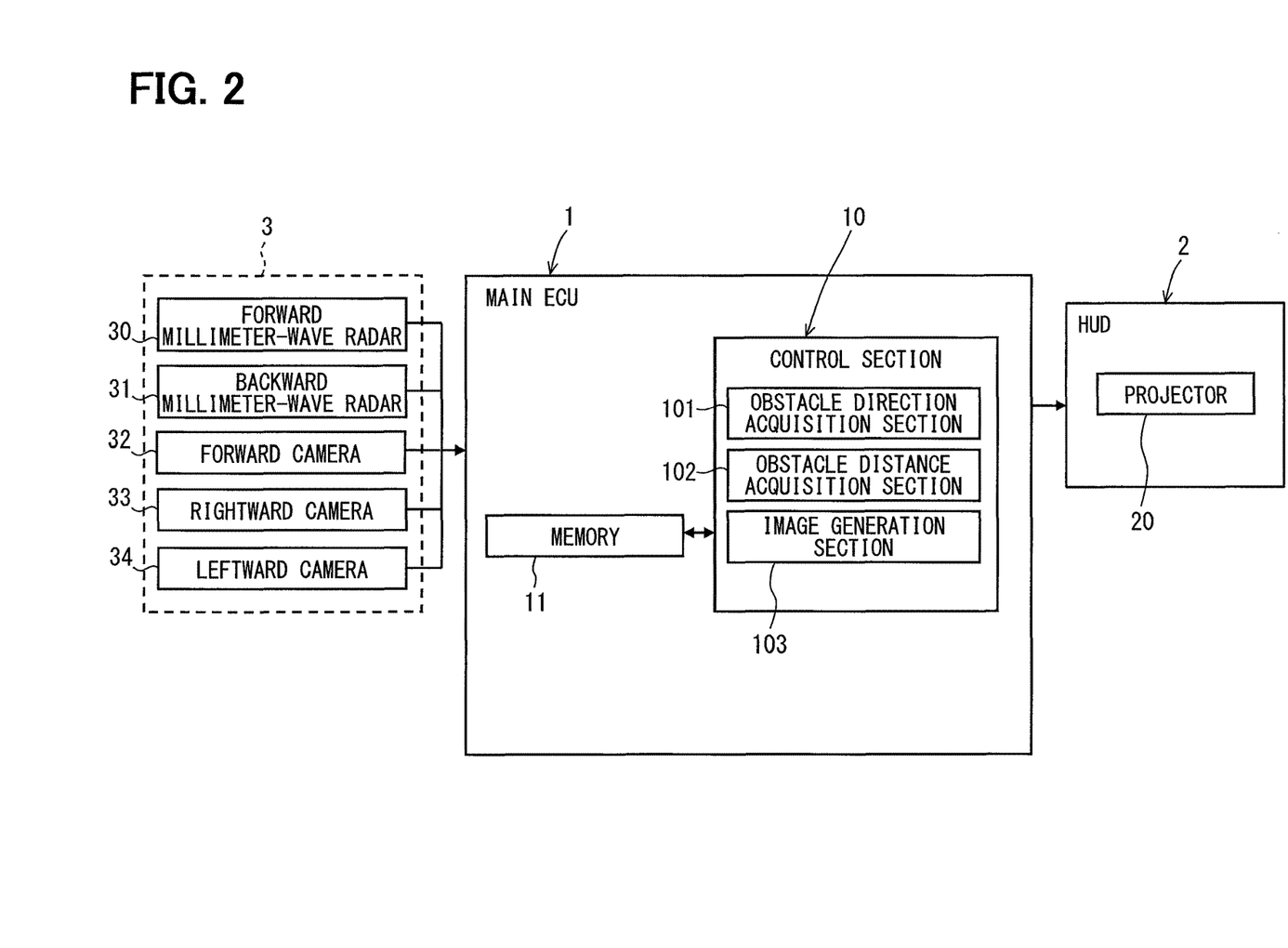
FIG. 2 is a configuration diagram illustrating a vehicular display control apparatus according to the first embodiment.

As illustrated in FIG. 2, a main ECU 1 is provided as the vehicular display control apparatus according to the embodiment and is connected to an information input section 3 and the HUD 2. The main ECU 1 controls an image irradiated by the HUD 2 based on information acquired from the information input section 3. A process performed by the main ECU 1 will be described in detail later.

The information input section 3 includes a forward millimeter-wave radar 30, a backward millimeter-wave radar 31, a forward camera 32, a rightward camera 33, and a leftward camera 34.

The forward millimeter-wave radar 30 is provided at the front of the subject vehicle 80 and at the center of the subject vehicle 80 in the width direction. The forward millimeter-wave radar 30 transmits millimeter waves forward from the subject vehicle while scanning within a horizontal plane. The forward millimeter-wave radar 30 receives the reflected millimeter waves to acquire transmitted and received data. The forward millimeter-wave radar 30 transmits the transmitted and received data as a radar signal to the main ECU 1.

The backward millimeter-wave radar 31 is provided at the rear of the subject vehicle 80 and at the center of the subject vehicle 80 in the width direction. The backward millimeter-wave radar 31 transmits millimeter waves backward from the subject vehicle while scanning within a horizontal plane. The backward millimeter-wave radar 31 receives the reflected millimeter waves to acquire transmitted and received data. The backward millimeter-wave radar 31 transmits the transmitted and received data as a radar signal to the main ECU 1.

The forward camera 32 is provided at the top and approximately at the center of the windshield 70. The forward camera 32 captures a scene ahead of the subject vehicle 80 as an image. The forward camera 32 transmits an image signal to the main ECU 1.

The rightward camera 33 is provided for a right side mirror of the subject vehicle 80 and a lens is directed to the rear of the subject vehicle 80. The rightward camera 33 can therefore capture a scene at the rear of the subject vehicle 80 to the right from the center. The rightward camera 33 transmits the captured image as an image signal to the main ECU 1.

The leftward camera 34 is provided for a left side mirror of the subject vehicle 80 and a lens is directed to the rear of the subject vehicle 80. The leftward camera 34 can therefore capture a scene at the rear of the subject vehicle 80 to the left from the center. The leftward camera 34 transmits the captured image as an image signal to the main ECU 1.

The HUD 2 acquires the image generated by the main ECU 1. The projector 20 irradiates the image as the light. As above, the light projected by the projector 20 is reflected to the occupant 90. The occupant 90 can recognize the image projected by the projector 20 as a virtual image.

The main ECU 1 includes a control section 10 and a memory module 11. The memory module 11 can store various information.

The control section 10 is configured as a microcomputer including a processor, RAM, and flash memory. The processor performs various calculation processes. The RAM functions as a work area for calculation processes. The flash memory stores a program used for calculation processes. Therefore, the control section 10 performs calculation processes based on the stored program. The control section 10 according to the embodiment functions as an obstacle direction acquisition section 101, an obstacle distance acquisition section 102, and an image generation section 103.

The obstacle direction acquisition section 101 acquires the direction of an obstacle around the subject vehicle 80 based on a signal acquired from the information input section 3. The obstacle distance acquisition section 102 acquires a distance between the subject vehicle 80 and the obstacle around the subject vehicle 80 based on the signal acquired from the information input section 3. The image generation section 103 generates an image corresponding to the direction and the distance of the obstacle with reference to the subject vehicle 80. Images generated by the image generation section 103 will be described in detail later.

The description below explains processes performed by the obstacle direction acquisition section 101 and the obstacle distance acquisition section 102 by using an example where a different vehicle exists at the right rear of the subject vehicle 80.

The backward millimeter-wave radar 31 transmits millimeter waves to detect the direction of an object and the distance to the same relative to the subject vehicle 80. The main ECU 1 acquires this information from the backward millimeter-wave radar 31. The main ECU 1 can acquire that an obstacle exists at the right rear of the subject vehicle 80. The main ECU 1 acquires speed information about the obstacle existing behind based on the information acquired from the backward millimeter-wave radar 31.

The main ECU 1 performs image processing on an image acquired by the rightward camera 33. The main ECU 1 can thereby acquire information that the obstacle at the right rear is a different vehicle.

The main ECU 1 can thereby acquire the direction, distance, and type of an obstacle around the subject vehicle 80 based on the signal acquired from the information input section 3.

The description below explains images generated by the image generation section 103 with reference to FIGS. 3 through 5.

Figure 3:
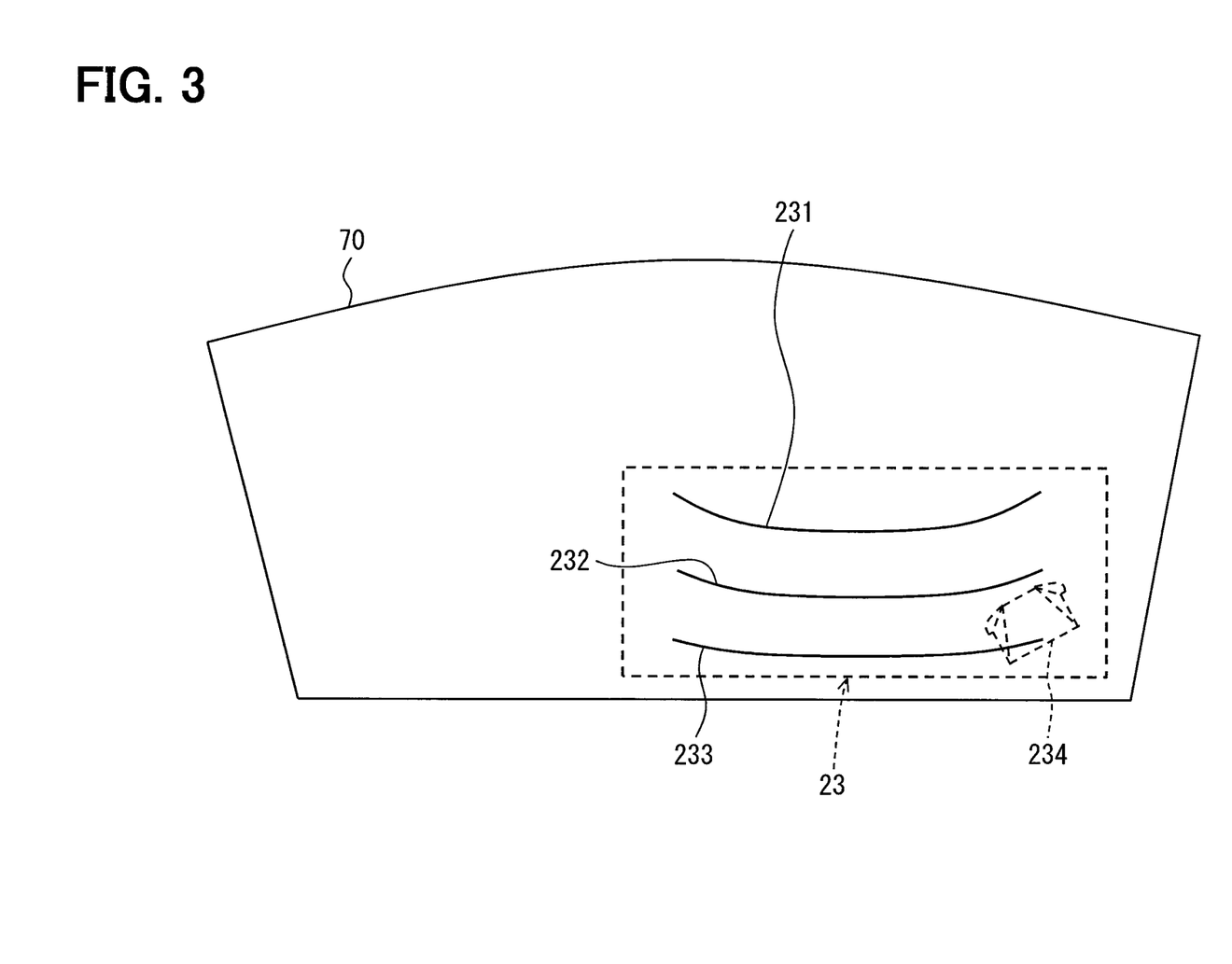
FIG. 3 illustrates a first example of a virtual image according to the first embodiment when there is an obstacle behind a subject vehicle.

FIG. 3 illustrates a virtual image of an image generated by the image generation section 103 when a different vehicle exists at the right rear of the subject vehicle 80. The occupant 90 visually recognizes a virtual image of an image projected by the HUD 2. The virtual image is visually recognized through a windshield 70. A position where the virtual image is visually recognized is a position toward a driver's seat from the center of the windshield 70.

The occupant 90 visually recognizes the virtual image in a display region 23. Namely, the HUD 2 can represent various information in the display region 23. The display region 23 depends on the size of a display surface of the projector 20. The size of a display surface is limited. An available area of the display region 23 is somewhat limited.

The image generation section 103 generates a plurality of line images such as a top line image, a middle line image, and a bottom line image. The image generation section 103 generates a different vehicle image. A top-line virtual image 231 represents a virtual image of the top line image. A middle-line virtual image 232 represents a virtual image of the middle line image. A bottom-line virtual image 233 represents a virtual image of the bottom line image. A different-vehicle virtual image 234 represents a virtual image of the different vehicle image. The top-line virtual image 231, the middle-line virtual image 232, and the bottom-line virtual image 233 are concave downward. The different-vehicle virtual image 234 is represented by a broken line. The top-line virtual image 231 is visually recognized toward the top from the center of the display region 23. The occupant 90 visually recognizes the top-line virtual image 231, the middle-line virtual image 232, and the bottom-line virtual image 233 that are placed in an upward-to-downward direction.

A depth of the concave shape of the top-line virtual image 231 is larger than a depth of the concave shape of the middle-line virtual image 232. The depth of the concave shape of the middle-line virtual image 232 is larger than a depth of the concave shape of the bottom-line virtual image 233. The depth of each line virtual image signifies an upward-to-downward direction between the highest part upward and the lowest part downward in each line virtual image.

The luminance of the top-line virtual image 231 is higher than the luminance of the middle-line virtual image 232. The luminance of the middle-line virtual image 232 is higher than the luminance of the bottom-line virtual image 233.

Figure 4:
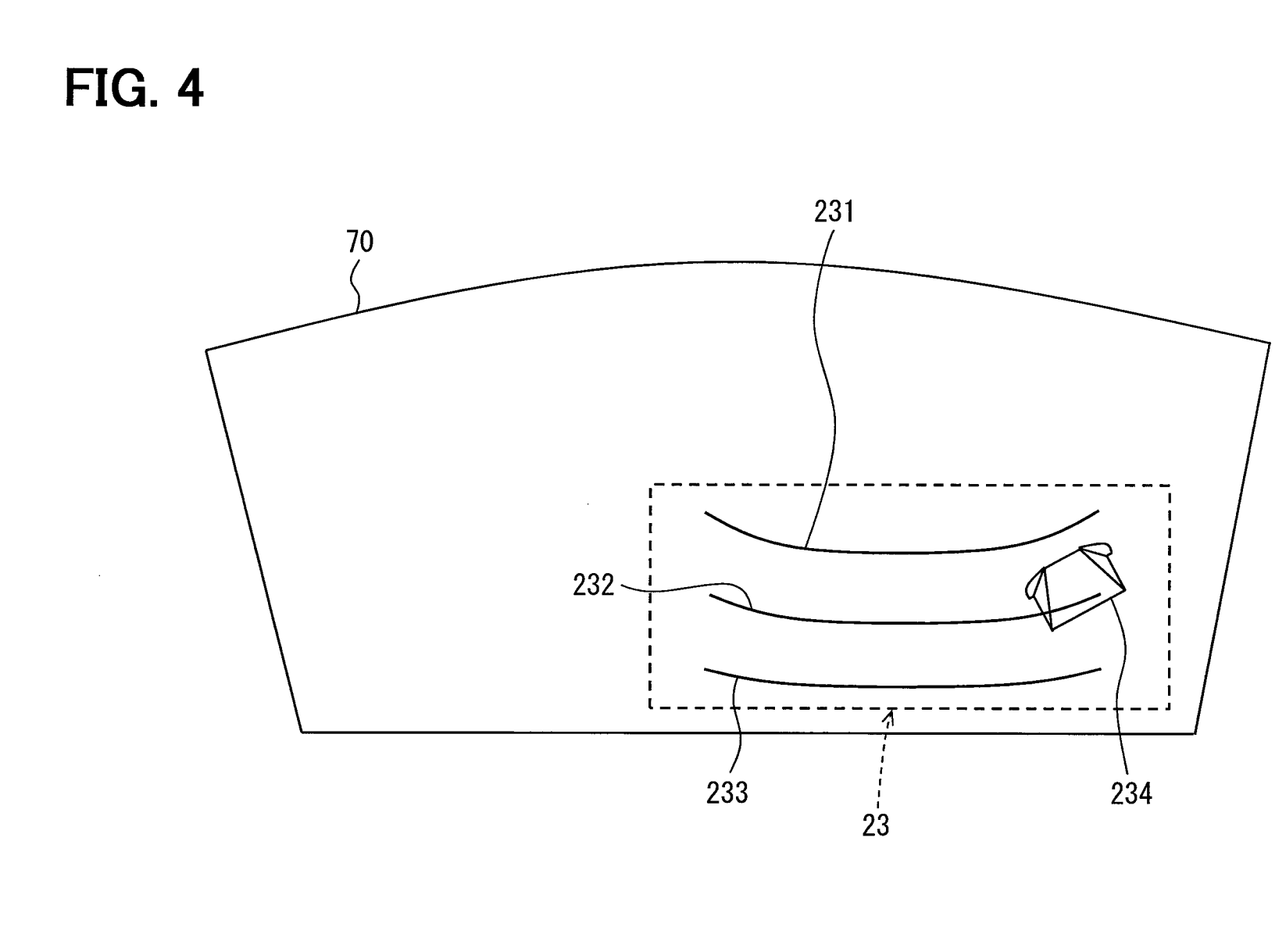
FIG. 4 illustrates a second example of a virtual image according to the first embodiment when there is an obstacle behind a subject vehicle.

FIG. 4 illustrates a virtual image of an image generated by the image generation section 103 when the different vehicle further approaches the subject vehicle 80 from the situation in FIG. 3. Unlike the situation in FIG. 3, the different-vehicle virtual image 234 is represented by a solid line. A display form of the different-vehicle virtual image 234 varies with the actual distance between the subject vehicle 80 and an obstacle.

The different-vehicle virtual image 234 represents the front of the different vehicle, not the entire different vehicle.

Figure 5:
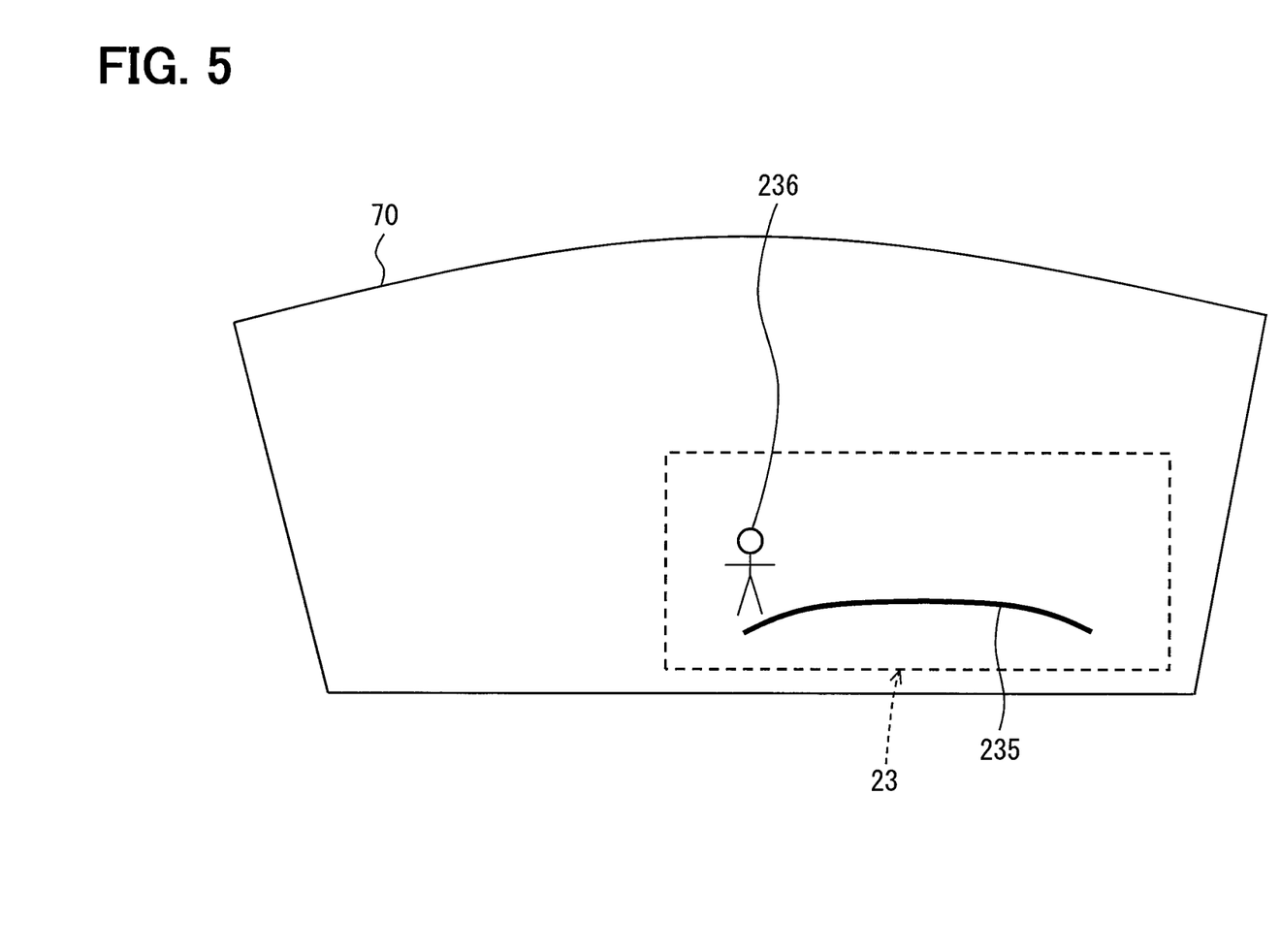
FIG. 5 illustrates an example of a virtual image according to the first embodiment when there is an obstacle ahead of a subject vehicle.

FIG. 5 illustrates a virtual image of an image generated by the image generation section 103 when a pedestrian exists at the left front of the subject vehicle 80. The occupant 90 visually recognizes a thick-line virtual image 235 and a pedestrian virtual image 236. The pedestrian virtual image 236 is visually recognized on an upper side of the thick-line virtual image 235. The thick-line virtual image 235 is visually recognized on a lower side of the center of the display region 23.

The thick-line virtual image 235 is concave upward differently from the top-line virtual image 231, the middle-line virtual image 232, and the bottom-line virtual image 233. The thick-line virtual image 235 is thicker in the line than the top-line virtual image 231, the middle-line virtual image 232, and the bottom-line virtual image 233.

The number of line virtual images depends on whether an obstacle exists behind the subject vehicle 80 as illustrated in FIGS. 3 and 4 or exists ahead of the subject vehicle 80 as illustrated in FIG. 5. Specifically, when an obstacle exits behind the subject vehicle 80, the number of line virtual images in the presence of an obstacle behind the subject vehicle 80 is larger than when an obstacle exists ahead of the subject vehicle 80.

The description below explains a sequence of a process that allows the occupant 90 to recognize an obstacle around the subject vehicle 80 with reference to FIGS. 6 through 8.

Figure 6:
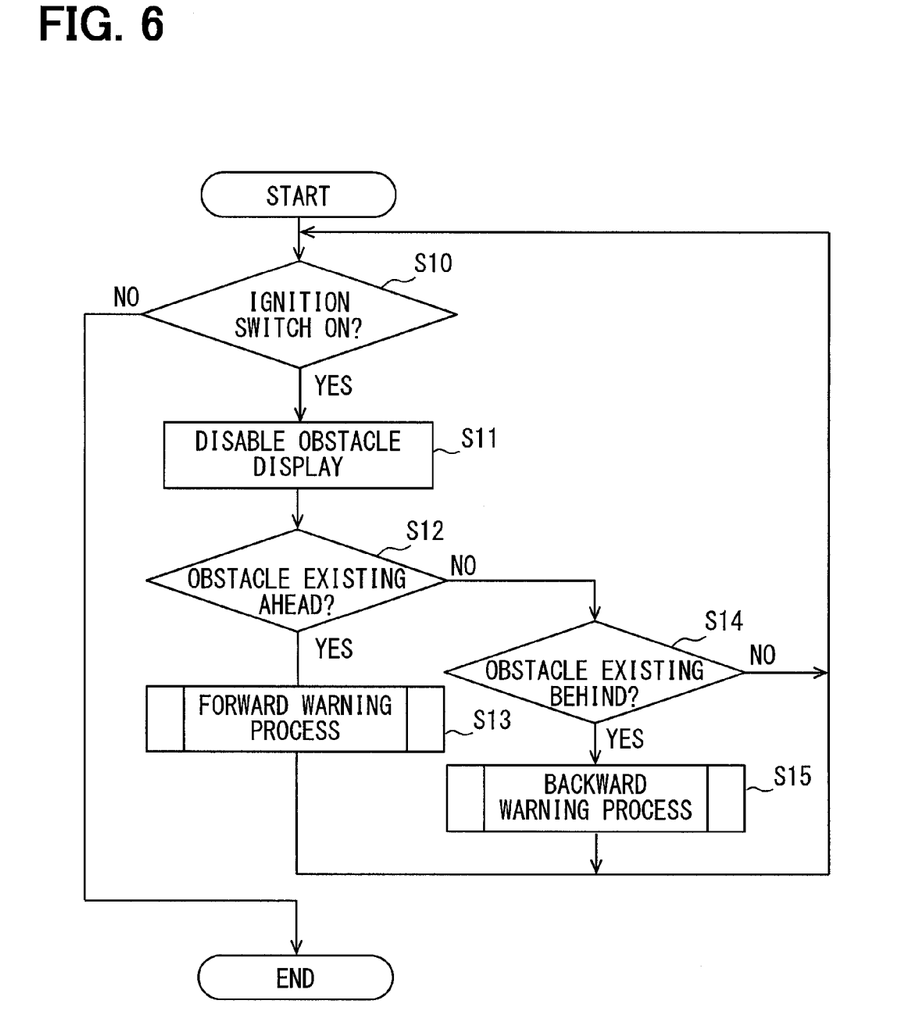
FIG. 6 is a flowchart illustrating a sequence of a process performed by the vehicular display control apparatus according to the first embodiment.

At step S10 in FIG. 6, the main ECU 1 detects whether an ignition switch is on or off. The process proceeds to step S11 if detecting that the ignition switch is on. Otherwise, this process is ended.

At step S11, the main ECU 1 provides control so that the HUD 2 does not display an image representing the relative positional relation between the subject vehicle 80 and an obstacle. The process proceeds to step S12. At this time, the HUD 2 may or may not display speed information about the subject vehicle 80.

At step S12, the main ECU 1 detects whether an obstacle exists ahead of the subject vehicle 80, based on signals acquired from the forward millimeter-wave radar 30 and the forward camera 32. The process proceeds to step S13 if an obstacle exists ahead of the subject vehicle 80. Otherwise, the process proceeds to step S14.

At step S13, the main ECU 1 performs a forward warning process. The process then returns to step S10. The forward warning process will be described in detail later.

At step S14, the main ECU 1 detects whether an obstacle exists behind the subject vehicle 80, based on signals acquired from the backward millimeter-wave radar 31, the rightward camera 33, and the leftward camera 34. The process proceeds to step S15 if an obstacle exists behind the subject vehicle 80. Otherwise, the process returns to step S10.

At step S15, the main ECU 1 performs a backward warning process. The process then returns to step S10. The backward warning process will be described in detail later.

Figure 7:
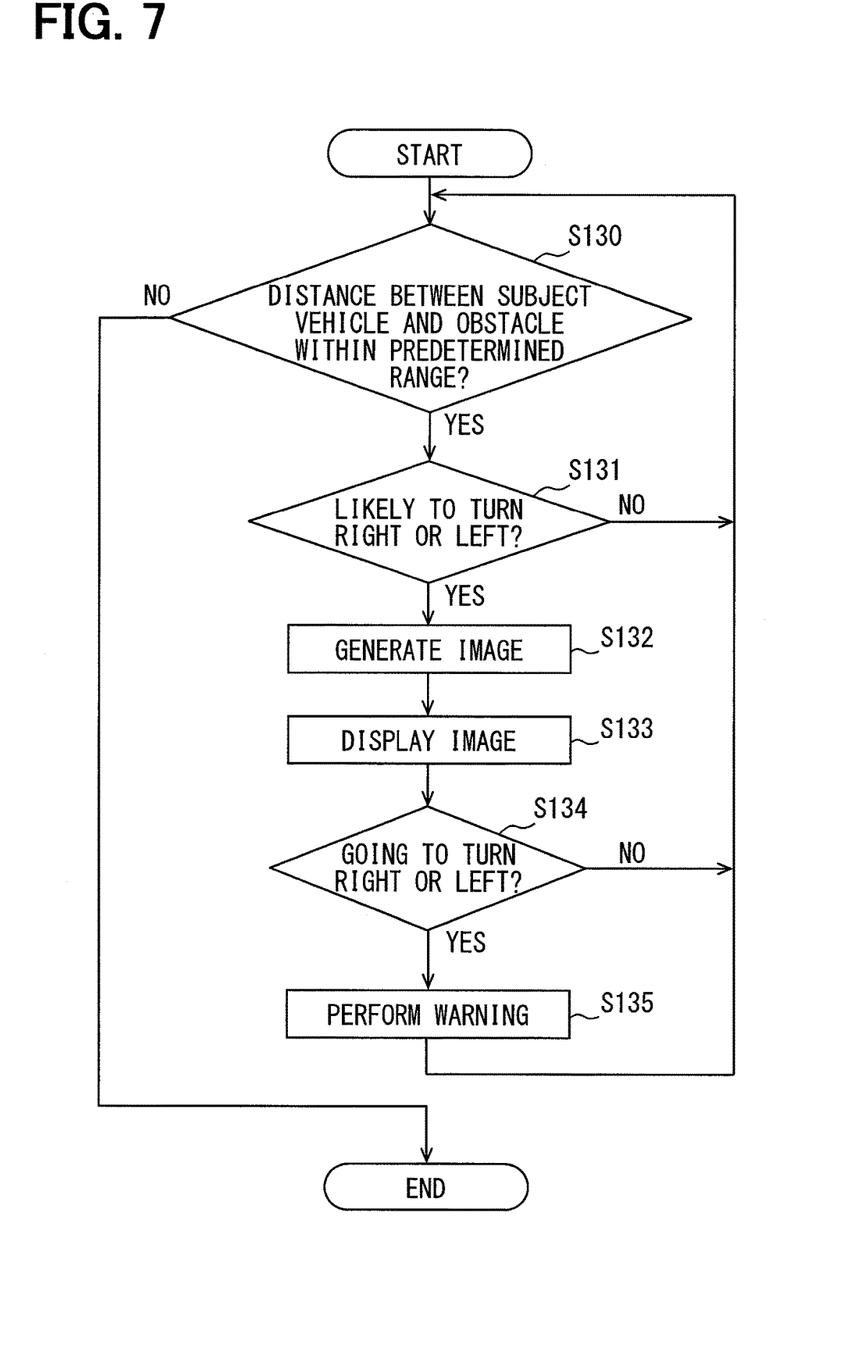
FIG. 7 is a flowchart illustrating a sequence of a forward warning process performed by the vehicular display control apparatus according to the first embodiment.

FIG. 7 illustrates specific contents of the forward warning process performed by the main ECU 1 at step S13.

At step S130, the main ECU 1 detects whether the distance between the subject vehicle 80 and the obstacle falls within a predetermined range. The process proceeds to step S131 if the distance falls within the predetermined range. Otherwise, the process terminates.

At step S131, the main ECU 1 detects whether the subject vehicle 80 is likely to turn right or left. Specifically, the main ECU 1 performs image processing on an image acquired by the forward camera 32 to detect the presence or absence of an intersection. The process proceeds to step S132 if the subject vehicle 80 is likely to turn right or left. Otherwise, the process returns to step S130.

At step S132, the image generation section 103 of the main ECU 1 generates an image based on the direction and the distance of the obstacle with reference to the subject vehicle 80. Specifically, as above, the image generation section 103 generates a line image so that the occupant 90 visually recognizes an upward concave line virtual image when the obstacle exists ahead of the subject vehicle 80. The image generation section 103 generates an obstacle image concerning the obstacle. The process then proceeds to step S133.

At step S133, the main ECU 1 transmits the image generated by the image generation section 103 to the HUD 2. The HUD 2 projects the image acquired from the main ECU 1 for the occupant 90. The process then proceeds to step S134.

At step S134, the main ECU 1 detects whether the subject vehicle 80 will actually turn right or left. Specifically, the main ECU 1 detects information about a direction indicator to detect whether the subject vehicle 80 will turn right or left. The process proceeds to step S135 if it is detected that the subject vehicle 80 will turn right or left. Otherwise, the process returns to step S130.

At step S135, the main ECU 1 warns the occupant 90. Specifically, the main ECU 1 provides control to vibrate a seat belt. The main ECU 1 also provides control so that a speaker generates a warning sound. The main ECU 1 also provides control to stop the subject vehicle 80 if it is detected that the subject vehicle 80 will actually turn right or left within a predetermined time. Moreover, the seat belt vibration increases as the distance between the subject vehicle 80 and the obstacle decreases. The volume of the warning sound generated by the speaker increases as the distance between the subject vehicle 80 and the obstacle decreases.

Figure 8:
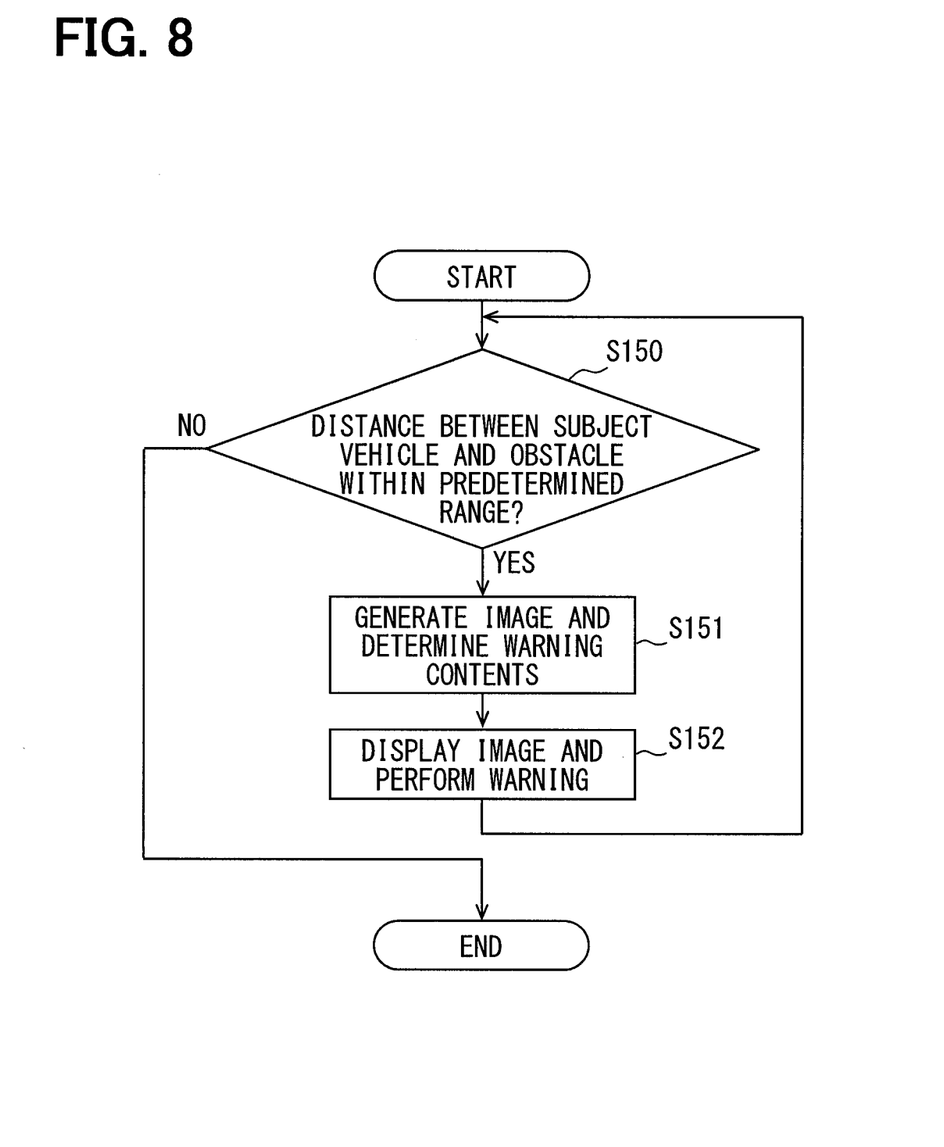
FIG. 8 is a flowchart illustrating a sequence of a backward warning process performed by the vehicular display control apparatus according to the first embodiment.

FIG. 8 illustrates specific contents of the backward warning process performed by the main ECU 1 at step S15.

At step S150 in FIG. 8, the main ECU 1 detects whether the distance between the subject vehicle 80 and the obstacle falls within a predetermined range. The process proceeds to step S151 if the distance falls within the predetermined range. Otherwise, the process terminates.

At step S151, the image generation section 103 generates an image based on information about the distance and the direction of the obstacle with reference to the subject vehicle 80. Specifically, the image generation section 103 generates a line image so that the occupant 90 visually recognizes a downward concave line virtual image when the obstacle exists behind the subject vehicle 80. The image generation section 103 generates an obstacle image concerning the obstacle. The main ECU 1 generates warning contents based on the information about the distance and the direction of the obstacle with reference to the subject vehicle 80. The process proceeds to step S152.

At step S152, the main ECU 1 transmits an image signal for the generated image to the HUD 2. The HUD 2 projects the image received from the main ECU 1 for the occupant 90. The main ECU 1 provides the occupant 90 with the generated warning contents. Specifically, the main ECU 1 provides control so that the speaker generates a warning sound. The main ECU 1 also provides control to vibrate the seat belt.

The description below explains effects of the main ECU 1 according to the first embodiment.

The main ECU 1 includes the obstacle direction acquisition section 101 and the image generation section 103. The main ECU 1 controls the HUD 2, which causes the windshield 7 to reflect an image and allows the occupant 90 of the subject vehicle 80 to visually recognize a virtual image of the image. The image generation section 103 generates a line image and an obstacle image concerning an obstacle around the subject vehicle. The obstacle direction acquisition section 101 acquires the obstacle direction relative to the subject vehicle 80. A line virtual image as a virtual image of the line image is formed to be upward concave when the obstacle direction acquisition section 101 acquires the presence of an obstacle ahead of the subject vehicle 80. A line virtual image is formed to be downward concave when the obstacle direction acquisition section 101 acquires the presence of an obstacle behind the subject vehicle 80. The position of an obstacle virtual image as a virtual image of the obstacle image depends on the obstacle direction acquired by the obstacle direction acquisition section 101 relatively to the subject vehicle in the width direction of the subject vehicle 80.

In this manner, the occupant 90 can recognize the direction of the concave shape of the line virtual image and thereby recognize whether the obstacle exists ahead of or behind the actual subject vehicle 80. The occupant 90 can recognize the position of the obstacle virtual image and thereby recognize in which direction the obstacle exists along the width direction of the actual subject vehicle 80. Moreover, an available area of the display region 23 to display the line virtual image is smaller than an available area of the display region 23 to display a virtual image of the image representing the entire subject vehicle 80. The occupant 90 can therefore recognize an obstacle around the subject vehicle 80 by reducing the available area of the display region 23.

Furthermore, according to the embodiment, when an obstacle exists ahead of the subject vehicle 80, a line virtual image visually recognized by the occupant 90 simulates the front of the subject vehicle 80 and is upward concave. When an obstacle exists behind the subject vehicle 80, a line virtual image visually recognized by the occupant 90 simulates the rear of the subject vehicle 80 and is downward concave. The embodiment shapes the line virtual image by simulating the shape of the subject vehicle 80. The occupant 90 can therefore intuitively recognize the direction in which the obstacle exists.

The main ECU 1 also includes the obstacle distance acquisition section 102 that acquires distance information between an obstacle and the subject vehicle 80. The positional relation between an obstacle virtual image and a line virtual image depends on the distance information acquired by the obstacle distance acquisition section 102.

In this manner, the occupant 90 can recognize the relative distance and direction between the obstacle virtual image and the line virtual image and thereby recognize a degree of approach between the actual subject vehicle 80 and the obstacle.

There are a plurality of line virtual images in the horizontal direction. Of the line virtual images, display mode of a line virtual image on an upper side differs from display mode of a line virtual image on a lower side.

As above, the occupant 90 visually recognizes a plurality of line virtual images. The occupant 90 can recognize the relative distance and direction of the obstacle virtual image with reference to the line virtual images and thereby more intuitively recognize the degree of approach between the actual subject vehicle 80 and the obstacle. As above, a line virtual image toward a first direction differs from a line virtual image toward a second direction in the display mode. The occupant 90 can therefore recognize the display mode of the line virtual image and thereby more intuitively recognize the degree of approach between the actual subject vehicle 80 and the obstacle.

An obstacle may exist ahead of and behind the subject vehicle 80 at the same time. In such a case, images are controlled so that the occupant 90 preferentially visually recognizes an obstacle virtual image concerning the obstacle ahead of the subject vehicle 80 in preference to an obstacle virtual image concerning the obstacle behind the subject vehicle 80.

The occupant 90 is more likely to recognize an obstacle ahead because the subject vehicle 80 travels forward. In consideration of this, the above-mentioned configuration enables the occupant 90 to preferentially recognize an obstacle ahead of the actual subject vehicle 80 in preference to an obstacle behind the subject vehicle 80.

The number of line virtual images and the line thickness depend on whether an obstacle exists behind or ahead of the subject vehicle 80.

The occupant 90 can recognize the number of lines or the line thickness and thereby recognize whether the obstacle exists ahead of or behind the actual subject vehicle 80.

The display mode of an obstacle virtual image depends on the positional relation between the obstacle virtual image and the line virtual image.

The occupant 90 can recognize the display mode of the obstacle virtual image and thereby intuitively recognize the degree of approach between the actual subject vehicle 80 and the obstacle.

Second Embodiment

The above-mentioned first embodiment provides the occupant 90 with a virtual image of an image representing the relative direction and distance with reference to the subject vehicle 80 when an obstacle approaches the subject vehicle 80 from behind. The second embodiment does not provide the occupant 90 with a virtual image only because an obstacle approaches the subject vehicle 80 from behind. The occupant 90 is provided with a virtual image when the subject vehicle 80 is likely to change a lane.

Figure 9:
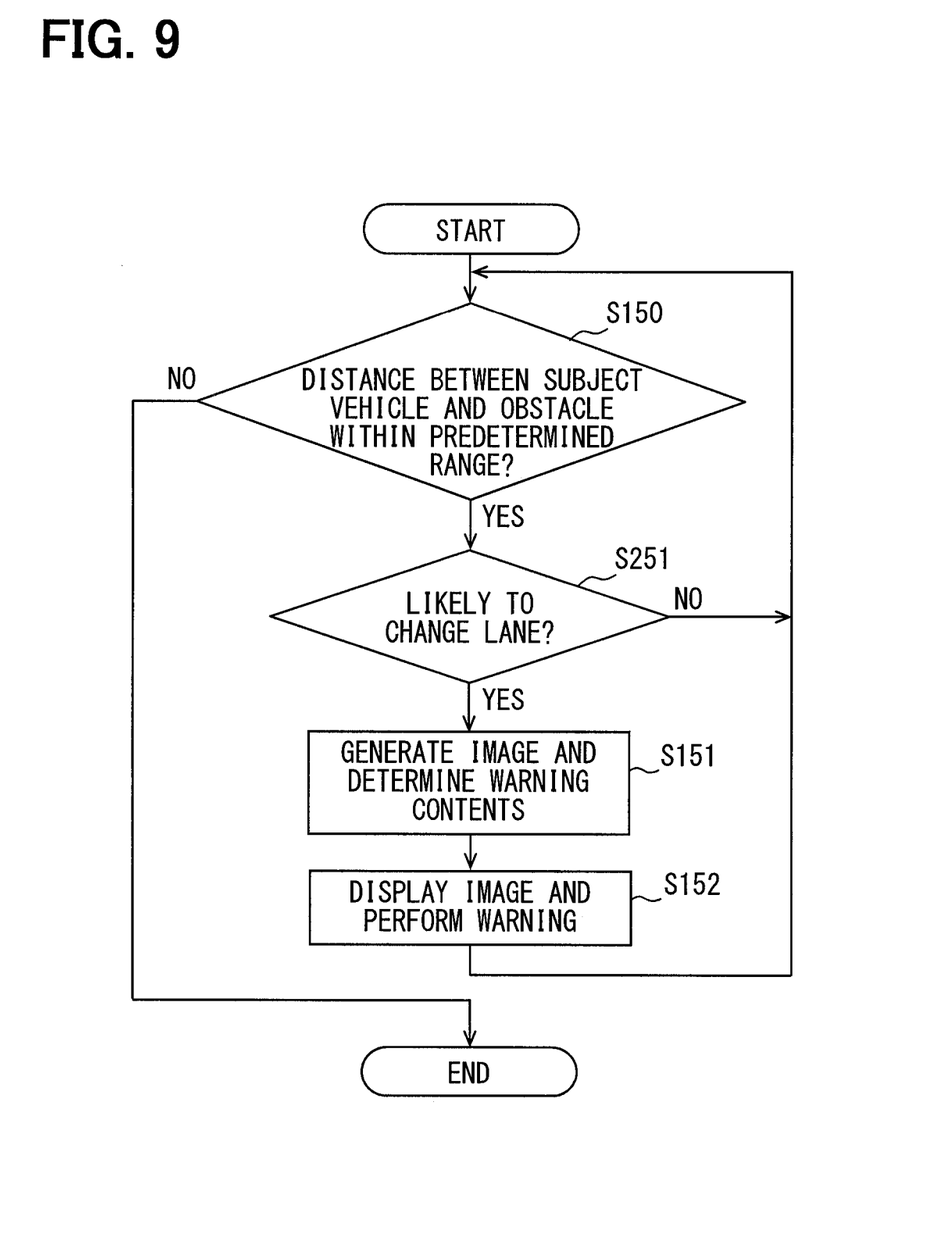
FIG. 9 is a flowchart illustrating a sequence of a backward warning process performed by the vehicular display control apparatus according to a second embodiment.

FIG. 9 is a flowchart illustrating the backward warning process according to the second embodiment. The description below explains differences from the first embodiment.

At step S150, the process may determine that the distance between the subject vehicle 80 and the obstacle falls within a predetermined range. In this case, the process proceeds to step S251.

At step S251, the main ECU 1 detects whether the subject vehicle 80 is likely to change a lane. Specifically, the main ECU 1 detects whether an obstacle exists within the predetermined range ahead of the subject vehicle 80. The subject vehicle 80 is likely to change the lane if an obstacle exists within the predetermined range ahead of the subject vehicle 80. The process proceeds to step S151 if the subject vehicle 80 is likely to change the lane. Otherwise, the process returns to step S150.

Figure 10:
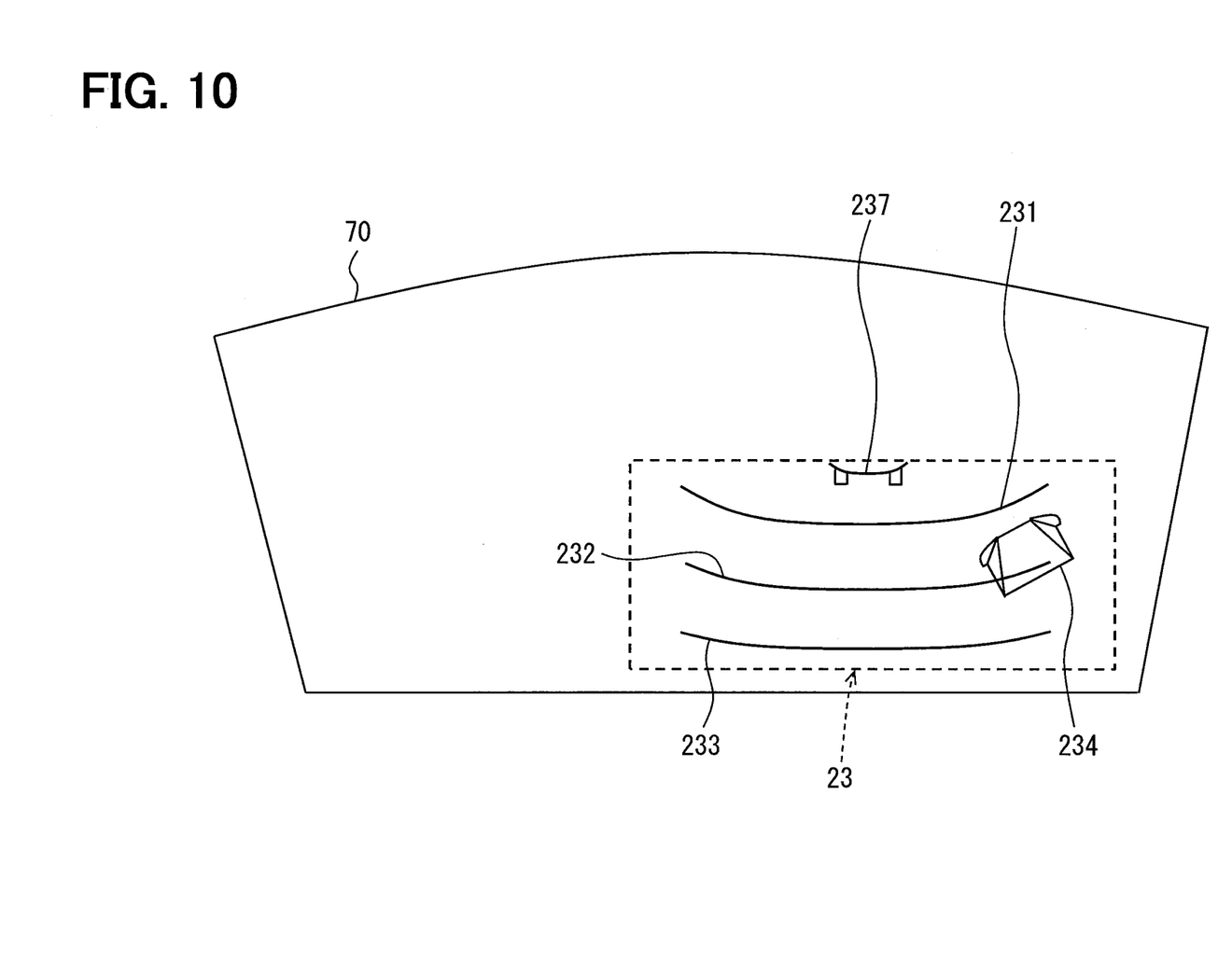
FIG. 10 illustrates an example of a virtual image according to the second embodiment when a lane is changed.

FIG. 10 illustrates a virtual image representing how a lane is changed. The virtual image includes a forward different-vehicle virtual image 237 that corresponds to an image ahead of the subject vehicle 80. The occupant 90 is supplied with the top-line virtual image 231, the middle-line virtual image 232, the bottom-line virtual image 233, and the different-vehicle virtual image 234 corresponding to a virtual image concerning an obstacle existing behind the subject vehicle 80. Namely, the occupant 90 visually recognizes both the virtual image concerning the obstacle ahead of the subject vehicle 80 and the virtual image concerning the obstacle behind the subject vehicle 80. The occupant 90 can therefore visually recognize the forward different-vehicle virtual image 237 and the different-vehicle virtual image 234 and thereby recognize the relative directions and distances of obstacles ahead of and behind the actual subject vehicle 80 with reference to the subject vehicle 80.

OTHER EMBODIMENTS

The embodiments have been illustrated but these are not limiting and there may be various modifications illustrated below. It is possible to provide combinations of parts that are explicitly described being combinable in respective embodiments but also combinations of parts of embodiments not explicitly described as long as combinations cause confliction.

For example, the first embodiment assumes the first direction to be upward and the second direction to be downward, but these may be reversed. Namely, the first direction may be downward and the second direction may be upward.

The first embodiment varies the depth and the luminance of the concave shape in terms of the display mode of the top-line virtual image 231, the middle-line virtual image 232, and the bottom-line virtual image 233, but these are not limiting. For example, the line thickness or color may be varied.

The first embodiment differentiates the number of line virtual images in the presence of an obstacle ahead of the subject vehicle 80 from the number of line virtual images in the presence of an obstacle behind the subject vehicle 80, but is not limited thereto. The line type may be varied to a broken line or a solid line, for example.

The first embodiment changes the display mode of the obstacle virtual image between the solid line and the broken line depending on the distance between the subject vehicle 80 and an obstacle, but these are not limiting. The color or the size of the obstacle virtual image may vary with the distance between the subject vehicle 80 and an obstacle, for example.

The first embodiment uses a solid line to represent a line virtual image such as the top-line virtual image 231 or the thick-line virtual image 235, but may use a broken or dotted line. The line virtual image is smoothly curved, but may be represented as an angled line as illustrated in FIG. 11.

Figure 11:
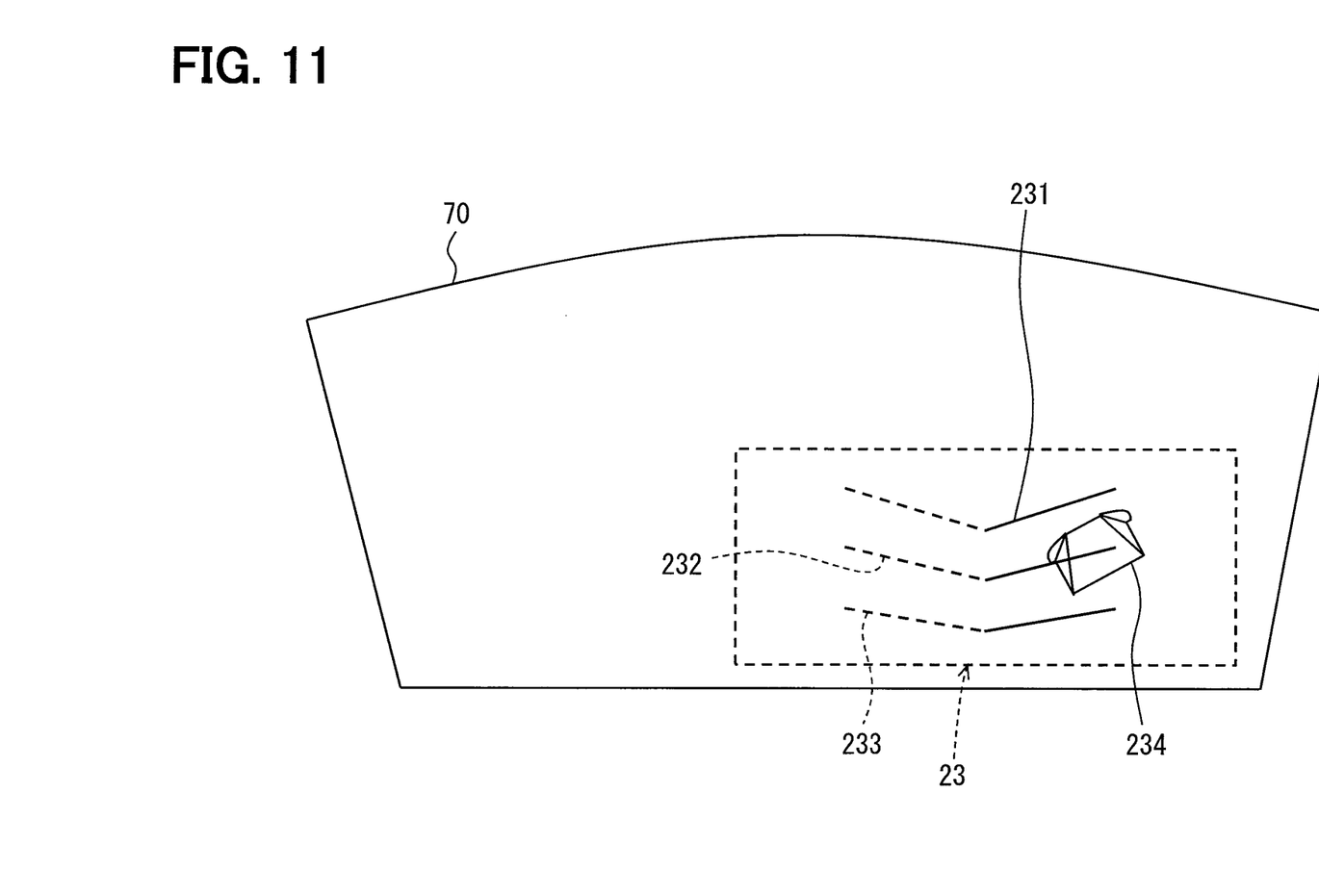
FIG. 11 illustrates an example of a virtual image according to other embodiments when there is an obstacle behind a subject vehicle.

As illustrated in FIG. 11, a solid line may represent part of a line virtual image toward the position to display the different-vehicle virtual image 234 and a broken line may represent another part different from the former. Namely, different display modes may be used for part of the line virtual image toward the position of the obstacle virtual image and another part thereof different from the former.

The occupant 90 can therefore recognize the display mode of the line virtual image and thereby more intuitively recognize the relative direction of an obstacle with reference to the actual subject vehicle 80.

The above-mentioned first embodiment allows the obstacle direction acquisition section 101 or the obstacle distance acquisition section 102 to acquire information about an obstacle from the information input section 3 mounted on the subject vehicle 80, but these are not limiting. For example, the main ECU 1 may include a communication function and acquire information from a different vehicle or an infrastructure.

The above-mentioned first embodiment allows the HUD 2 to reflect an image onto the windshield 70. However, a combiner may be additionally provided to reflect an image.

According to the above-mentioned first embodiment, the main ECU 1 performs the image processing on an image acquired from the forward camera 32 and thereby detects a possibility of the subject vehicle 80 turning right or left. However, the embodiments are not limited to this. The main ECU 1 may acquire intersection information from a navigation system to detect a possibility of turning right or left.

According to the above-mentioned first embodiment, the main ECU 1 detects whether the subject vehicle 80 turns right or left, based on the information about the direction indicator. However, the embodiments are not limited to this. The main ECU 1 may acquire information about a route traveled by the subject vehicle 80 from a navigation system to detect whether the subject vehicle 80 turns right or left.

An image acquired from each camera may be used as is or a pseudo image may be generated as an obstacle image the image generation section 103 generates.

When an obstacle exists ahead of and behind the subject vehicle 80 at the same time, the above-mentioned first embodiment preferentially displays an image concerning the obstacle ahead of the subject vehicle 80 and does not display an image concerning the obstacle behind the subject vehicle 80. However, the embodiments are not limited to this. When an obstacle exists ahead of and behind the subject vehicle 80 at the same time, a large image may be displayed to represent the obstacle ahead of the subject vehicle 80 and a small image may be displayed to represent the obstacle behind the subject vehicle 80.

The occupant 90 can therefore preferentially recognize an obstacle ahead of the subject vehicle 80 and also recognize an obstacle behind the subject vehicle 80.

Unlike the above-mentioned embodiments, the head-up display apparatus 2 may include the main ECU 1.

What is claimed is:

1. A vehicular display control apparatus that controls an image reflecting off one of a windshield and a combiner to allow an occupant of a subject vehicle to visually recognize a virtual image of the image, the apparatus comprising:
    an image generation section that generates a line image and an obstacle image concerning an obstacle around the subject vehicle; and
    an obstacle direction acquisition section that acquires a relative direction of the obstacle with reference to the subject vehicle,
    wherein:
    when the obstacle direction acquisition section acquires presence of the obstacle ahead of the subject vehicle, a line virtual image serving as the virtual image of the line image is shaped in concave in a first direction, the first direction being one of upward and downward;
    when the obstacle direction acquisition section acquires presence of the obstacle behind the subject vehicle, the line virtual image is shaped in concave in a second direction, the second direction being opposite to the first direction; and
    a position of an obstacle virtual image serving as the virtual image of the obstacle image depends on a relative direction of the obstacle with reference to the subject vehicle along a width direction of the subject vehicle acquired by the obstacle direction acquisition section.

2. The vehicular display control apparatus according to claim 1, further comprising:
    an obstacle distance acquisition section that acquires distance information between the obstacle and the subject vehicle,
    wherein
    positional relation between the obstacle virtual image and the line virtual image depends on the distance information.

3. The vehicular display control apparatus according to claim 2, wherein:
    a plurality of the line virtual images are available in an upward-to-downward direction; and
    a display mode for the line virtual image toward the first direction differs from a display mode for the line virtual image toward the second direction out of the line virtual images.

4. The vehicular display control apparatus according to claim 1, wherein
    a display mode for part of the line virtual image nearer to the obstacle virtual image differs from a display mode for another part of the line virtual image different from the part.

5. The vehicular display control apparatus according to claim 1, wherein
    the image is controlled so that the occupant is allowed to preferentially visually recognize the obstacle virtual image concerning the obstacle ahead of the subject vehicle in preference to the obstacle virtual image concerning the obstacle behind the subject vehicle when the obstacles concurrently exist ahead of and behind the subject vehicle.

6. The vehicular display control apparatus according to claim 1, wherein
    the number of the line virtual images and/or a line type of the line virtual image depends on whether the obstacle existing behind the subject vehicle or the obstacle existing ahead of the subject vehicle.

7. The vehicular display control apparatus according to claim 2, wherein
    a display mode for the obstacle virtual image depends on positional relation between the obstacle virtual image and the line virtual image.

* * * * *